United States Patent
Zhang

(10) Patent No.: US 7,316,339 B2
(45) Date of Patent: Jan. 8, 2008

(54) CARGO PLATFORM WITH FOLDABLE WALLS

(75) Inventor: Shouyun Zhang, Chino Hills, CA (US)

(73) Assignee: Larin Corporation, Ontario, CA (US)

( * ) Notice: Subject to any disclaimer, the term of this patent is extended or adjusted under 35 U.S.C. 154(b) by 526 days.

(21) Appl. No.: 10/833,445

(22) Filed: Apr. 27, 2004

(65) Prior Publication Data

US 2005/0242141 A1  Nov. 3, 2005

(51) Int. Cl.
- *B60R 9/00* (2006.01)
- *B60R 11/00* (2006.01)
- *B60R 7/00* (2006.01)

(52) U.S. Cl. ............ 224/499; 224/497; 224/498; 224/526; 224/525; 224/524; 224/519; 224/42.34

(58) Field of Classification Search .......... 224/499, 224/497, 498, 519, 524, 526, 42.34, 525
See application file for complete search history.

(56) References Cited

U.S. PATENT DOCUMENTS

| | | | | |
|---|---|---|---|---|
| 2,777,625 A | * | 1/1957 | Kronhaus et al. | 224/498 |
| 4,106,626 A | * | 8/1978 | Trubiano | 206/513 |
| 4,717,070 A | * | 1/1988 | Taub | 229/125.28 |
| 6,253,981 B1 | * | 7/2001 | McLemore | 224/526 |
| 6,382,486 B1 | * | 5/2002 | Kretchman et al. | 224/498 |
| 2005/0035167 A1 | * | 2/2005 | Threet et al. | 224/501 |

* cited by examiner

*Primary Examiner*—Nathan J. Newhouse
*Assistant Examiner*—Lester L. Vanterpool
(74) *Attorney, Agent, or Firm*—Greenberg Traurig, LLP

(57) ABSTRACT

A cargo carrier has a platform section. A set of foldable wall elements is for location in a first position substantially flat with a support region and in a second position substantially upright relative to the inner cargo support region. There can be two platform sections bolted together to form the overall platform section.

20 Claims, 4 Drawing Sheets

CARGO PLATFORM WITH FOLDABLE WALLS

BACKGROUND

The disclosure relates to a cargo carrier. These are carriers for location behind a vehicle and for permitting extra cargo to be carried by the vehicle.

SUMMARY OF DISCLOSURE

A cargo carrier has at least one platform section. Foldable wall elements are for location in a first position substantially flat with a support region and in a second position substantially upright relative to the inner cargo support region of a first platform section.

There can be two platform sections that are assembled together. A first set of foldable wall elements is for location in a first position substantially flat with a support region and in a second position substantially upright relative to the inner cargo support region of a first platform section. A second set of foldable wall elements is for location in a first position substantially flat with the support region and in a second position substantially upright relative to the inner cargo support region.

There are clamps to secure the foldable sections in the upright positions relative to the platform and in anchorage with each other.

Open ends of the platform sections are formed so that the two platform sections can be bolted together.

The disclosure is further described with reference to the drawings and description.

DRAWINGS

DESCRIPTION

Figure 1:
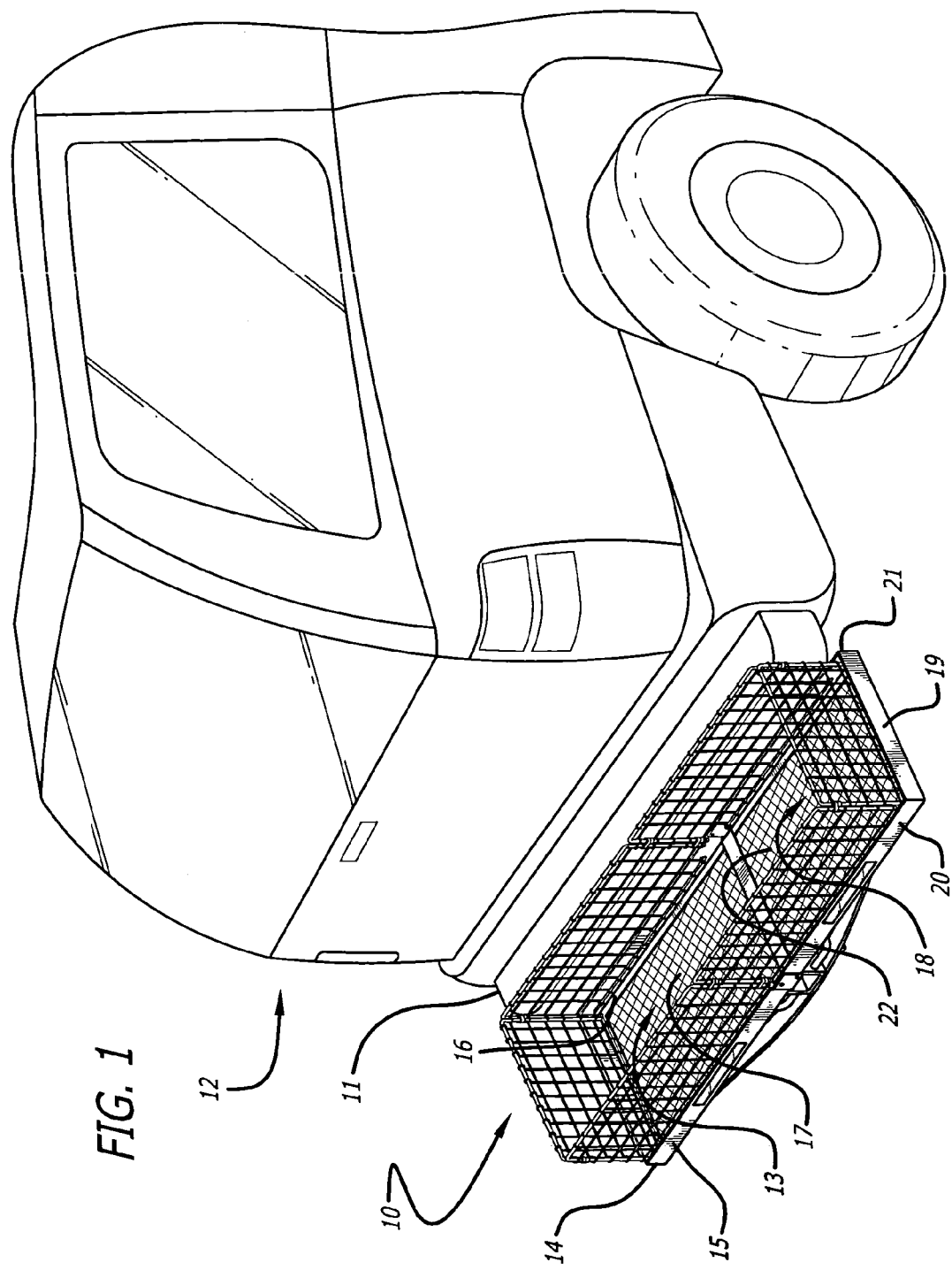
FIG. 1 is an overall view of the completely assembled cargo carrier behind a vehicle.
Figure 2:
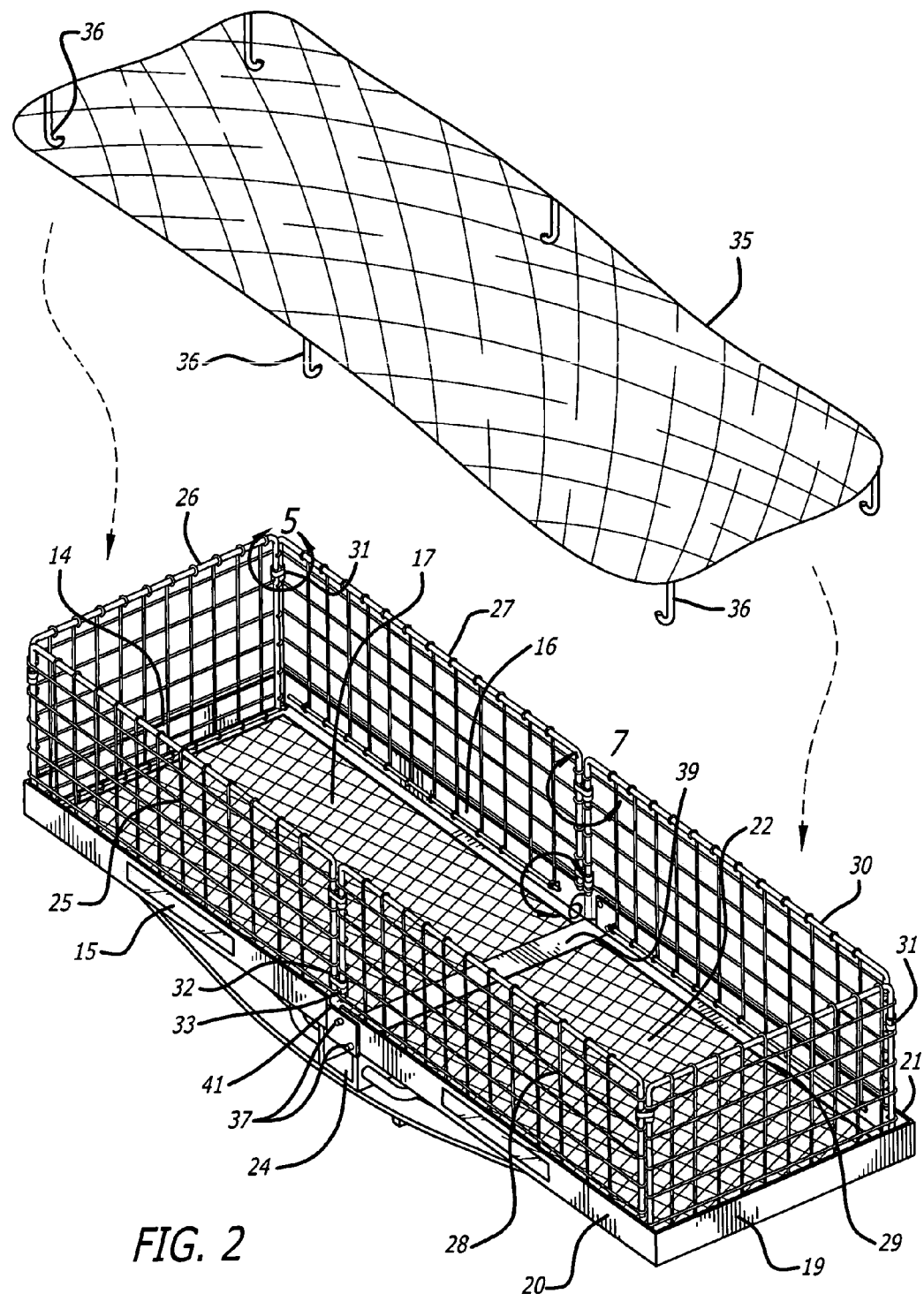
FIG. 2 is a view showing the platform and the upright collapsible walls and the cover removed from the walls.
Figure 3:
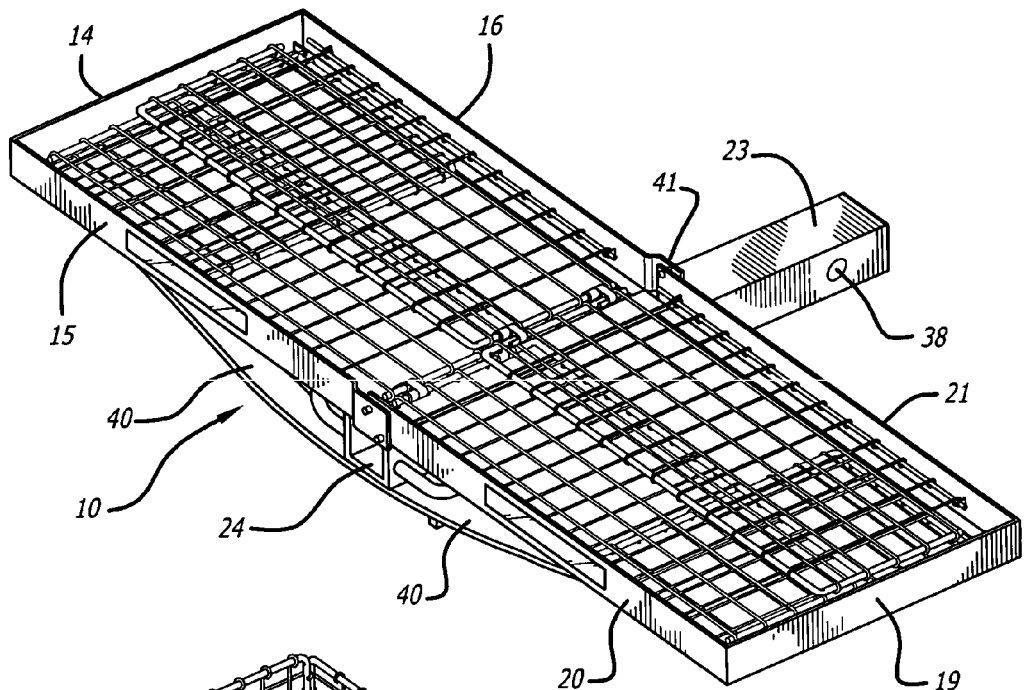
FIG. 3 is a view of the cargo carrier with the collapsible walls collapsed or folded on both the respective interior regions.
Figure 4:
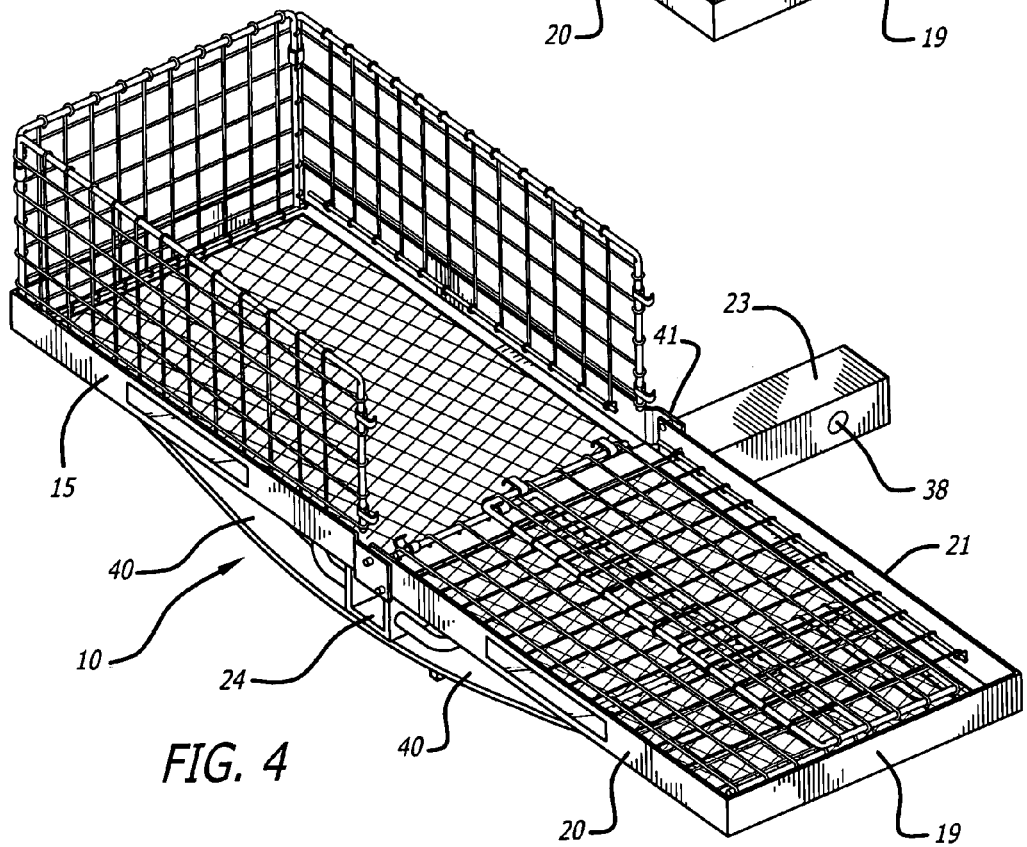
FIG. 4 is a view of the cargo carrier with the collapsible walls collapsed or folded on one of the respective interior regions and opened in the other of the interior regions.
Figure 5:
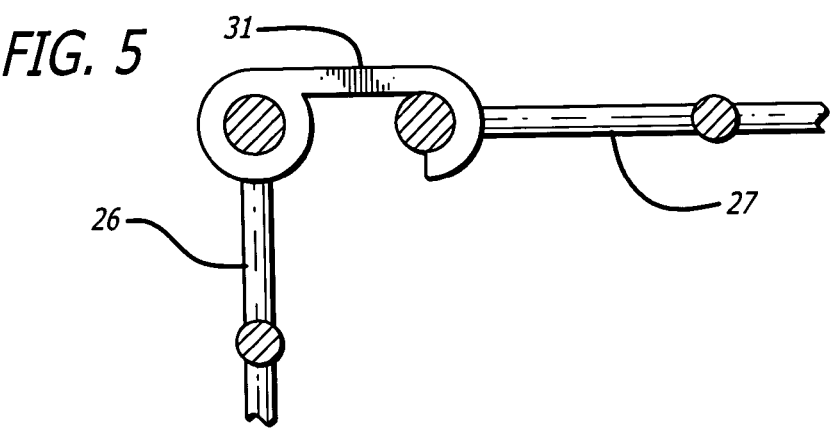
FIG. 5 is a detail of a corner clamp.
Figure 6:
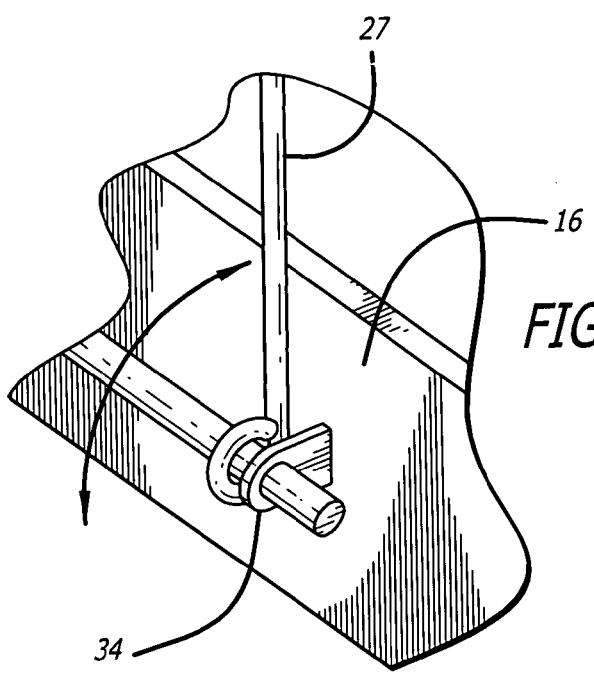
FIG. 6 is a detail showing the hinged formation of the collapsible wall relative to a support section of the platform.
Figure 7:
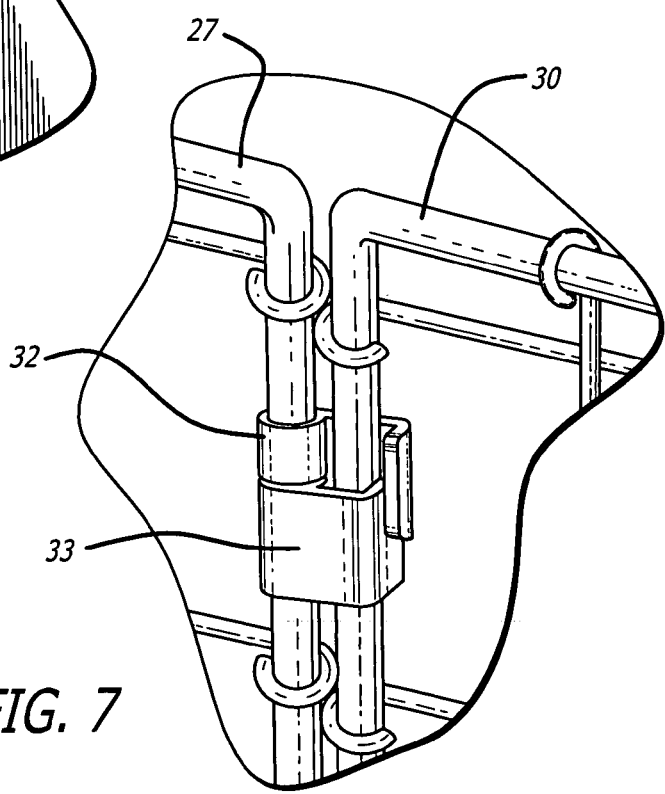
FIG. 7 is a detail of two clamps for securing together side walls of a respective first inner cargo support region and a respective second inner cargo support region.

A cargo carrier 10 for attachment to a rear portion 11 of a vehicle 12 comprises a first platform section 13 having an end wall 14 and first and second side walls 15 and 16 extending from opposite ends of said end wall 14 and having respective free ends. The first platform section 13 further comprises an inner cargo support region 17 extending between said side walls and the end wall.

There is also a second platform section 18 having an end wall 19 and first and second side walls 20 and 21 extending from opposite ends of the end wall 19 of said second platform section 18 and having respective free ends. The second platform section further comprises an inner cargo support region 22 extending between the side walls and end wall of said second platform section.

A receiver bar 23 has a first end for securing to the rear 11 of the vehicle 12 and an elongated main body extending to a second end 24 along a direction of elongation.

There is a first set of three foldable wall elements 25, 26 and 27 respectively for location in a first position substantially flat with the support region 17 and in a second position substantially upright relative to the inner cargo support region 17 of the first platform portion.

There is also a second set of three foldable wall elements 28, 29, and 30 for location in a first position substantially flat with the support region 22 and in a second position substantially upright relative to the inner cargo support region 22 of the second platform portion.

Each set of foldable wall elements includes three separate sections. One section is for anchorage adjacent to the end wall 14 and the other two sections are respectively for anchorage adjacent each of the respective side walls 15 and 16. The foldable wall elements are formed of a mesh material. The second set is similarly for engagement in relation to walls 19, 20, and 21.

Clamps 31 are provided at the interface corners for securing the foldable side walls relatively together when the walls are in an upright position. There are pairs of clamps 32 and 33 provided for securing the adjacent foldable walls of first and second sections together when the walls are upright. The clamps include an elongated portion where one end is secured in a rotatable manner to one of the side walls. The opposite end is an open clip formation, which can be articulated to be secured with the other adjacent side wall.

There can be clamps adjacent to the cargo area so that when the foldable walls are substantially adjacent to the inner cargo support regions of said platform sections, the walls are secured with the inner portions 17 and 22.

There are also hinge type constructs 34 provided to permit the walls to hinge or turn about the platform sections as necessary. The end walls 26 and 29 and the side walls 25 and 27 respectively and 28 and 30 respectively of the collapsible wall structure fold over themselves when they are in the collapsed position on the platform base.

The end wall and two side walls of each of said first and second platform sections extend vertically away from a respective one of said inner cargo support regions.

Mesh sheeting forms the inner cargo support regions.

There can also be a cover material 35 for overlaying the foldable walls when the foldable walls are in an upright relationship. The cover material 35 is for location at the top of the foldable walls. The material can be solid, rigid or flexible material. Ideally it is light weight and foldable to be put away when not in use. There are hooks 36 at the ends to secure the cover 35 with the upright portions of the walls.

Fasteners 37 are provided for securing the free ends of each section in said first and second platform portions nested relationships.

The first end of the receiver bar 23 includes a receiver hitch connection end with a hole 38. The receiver bar 23 can permit the platforms to articulate and thus fold against the rear 11 of the vehicle 12.

The first platform section 13 end wall and two side walls which together define a first U-shaped frame structure having an interior open frame end for the first platform section. The base is formed as a first mesh sheet having side edging supported by an inwardly extending flange of said first flange structure and an interior sheet edge at the open frame end of said first frame structure.

The second platform section 18 includes end wall and two side walls which together define a second U-shaped frame structure having an interior frame end, said second platform section. There is a second mesh sheet having side edging supported by an inwardly extending flange of said second U-shaped frame structure and an interior sheet edge at the open frame end of said second frame structure.

The first of the two side walls of said first frame structure is in a nested arrangement with a first of the two side walls of said second frame structure for reception with the nested second side walls. A second of the two side walls of said first frame structure is in a nested arrangement with a second of the two side walls of the said second frame structure for reception with the nested second side walls.

The first nested arrangement is provided in the first side wall of said first platform section and the second nested arrangement is provided in the second side wall of said second platform section.

The end wall and two side walls of each of said first and second platform sections extends vertically away from a respective one of said inner cargo support regions and each offset is provided to maintain an interior surface of the side walls of said first platform section in a common plane with an interior surface of a contacting side wall of said second platform section.

A tie plate 39 connects the two platform sections 13 and 18 together in the middle through a receiver bar 23 and a bridge supports 40.

Bent offset angle portions 41 are for engaging side walls of the platform sections 13 and 18. This arrangement allows the two platform sections to come together in an interengaging manner so as to keep the platform sections flush and square.

The platform sections 13 and 18 together form the cargo platform. When both platform sections are connected there is provided a cargo carrier platform for use with a vehicle. There is an end wall and two side walls have a bent offset angle 41 at its free end and the other side wall having a straight free end extension. Platform section features end wall and two side walls with side wall having bent offset angle 41, receiving the straight free end extension of side wall and with the straight free end extension of side wall being received by offset angle 41 of sidewall. This interrelationship provides for a flush arrangement to the interior surfaces of the side walls of the interconnected platform sections (see the flush arrangement for the lower surfaces.

The receiver bar 23 connects the cargo carrier to the receiver hitch on the back 11 of the vehicle 12. Bridge supports 40 enhance the strength of the platform, helping distribute the weight of cargo evenly across the platform sections.

The two platform sections 13 and 18 are secured together by placing the open ends of the platform sections together. On one side of each platform section the material is offset or bent outward at an angle so the two platform sections can be bolted together by bolts. The offset in the angle allows the two platform halves or sections to remain square or flush and appear as one solid platform. The tie plate adds to the structural integrity of the final assembly by securing the two platform sections together by way of the tie plate being positioned in the middle between the platform sections and extending over interior edges of the inner cargo support regions. The tie plate ends are notched out to give flexibility when bolting tie plate 39 to receiver bar 23 via bolts, with the tie plate, mesh flooring, and receiver bar being in a stacked relationship.

The offset angle is shown provided on one side of each of the open ends of the platform sections (shown in an opposite free end arrangement) with the material of the side walls having been bent outward to form an interior offset or angle. This arrangement allows the two halves of the platform to be bolted together so as to keep the sides of the platforms flat and square when assembled. The tie plate has a pair of punched open end holes, one on each end, for bolts to be placed through for easy assembly.

The offset angled bend and tie plate are thus constructed to tie the two halves of the cargo platform together for added strength and ease of assembly.

Many other forms of the disclosure exist each differing from others in matters of detail only. For instance the collapsible side walls and end walls may be made of a non-mesh material.

The invention is to be determined by the following claims.

I claim:

1. A cargo carrier for attachment to a vehicle, comprising:
   a platform section comprising an inner cargo support region extending between the periphery;
   said platform section with first and second side walls extending upwardly and end walls extending upwardly;
   a set of foldable wall elements comprising at least four wall elements; each of the set of foldable wall elements directly attached to each of the first and second side walls and the end walls of the platform section respectively for location in the first position substantially flat with the support region and in a second position substantially upright relative to the cargo support region;
   a receiver bar having a first end for securing to a receiver hitch on a vehicle and an elongated main body extending to a second end along a direction of elongation to support the cargo carrier;
   bridge support attached to the bottom surface of the platform section to support the cargo carrier.

2. A cargo carrier as recited in claim 1 wherein the set of foldable wall elements includes three separate sections, one section for anchorage adjacent to an end of the platform, and the other two respectively for anchorage adjacent each of the respective sides of the platform.

3. A cargo carrier for attachment to a vehicle, comprising:
   a first platform section having an end wall extending upwardly and first and second side walls extending upwardly off from opposite ends of the end wall and having respective free ends, said platform section further comprising a first inner cargo support region extending between said side walls;
   a second platform section having an end wall extending upwardly and first and second side walls extending upwardly off from opposite ends of the end wall of said second platform section and having respective free ends, said second platform section further comprising a second inner cargo support region extending between the side walls of said second platform section;
   bridge support attached to the bottom surface of the platform section to support the cargo carrier
   a first set of foldable wall elements; each of the first set of foldable wall elements directly attached to each of the first and second side walls and the end wall of the platform section respectively for location in a first position substantially flat with the support region and in a second position substantially upright relative to the first inner cargo support region;
   a second set of foldable wall elements; each of the second set of foldable wall elements directly attached to each of the first and second side walls and the end wall of the second platform section for location in a first position substantially flat with the support region and in a second position substantially upright relative to the second inner cargo support region.

4. A cargo carrier as recited in claim 3, wherein each set of foldable wall elements includes three separate sections, one section for anchorage adjacent to the end wall and the other two respectively for anchorage adjacent each of the respective side walls.

5. A cargo carrier as recited in claim 3, wherein the end wall and two side walls of each of said first and second platform sections extend vertically away from a respective one of said inner cargo support regions.

6. A cargo carrier as recited in claim 3, wherein the end wall and two side walls of each of said first and second platform sections extend vertically away from a respective one of said inner cargo support regions.

7. A cargo carrier as recited in claim 1 wherein the foldable walls are formed of a mesh material.

8. A cargo carrier as recited in claim 1 wherein there are clamps for securing the foldable walls adjacent the cargo area when the foldable walls are substantially adjacent to the inner cargo support regions of said platform sections.

9. A cargo carrier as recited in claim 1 wherein said inner cargo support regions are comprised of mesh sheeting.

10. A cargo carrier as recited in claim 1 including a cover material for overlaying the foldable walls when the foldable walls are in an upright relationship, the cover material being for location at the top of the foldable walls.

11. A cargo carrier as recited in claim 3 including fasteners for securing the free ends in said first and second nested relationships.

12. A cargo carrier as recited in claim 3 wherein the first end of said receiver bar includes a receiver hitch connection end with a hole.

13. A cargo carrier comprising:
 a first platform section which includes an end wall extending upwardly and two side walls extending upwardly which together define a first U-shapes frame structure having an interior open frame end, said first platform section further comprising a first mesh sheet having side edging supported by an inwardly extending flange of said first flange structure and an interior sheet edge at the open frame end of said first frame structure;
 a second platform section which includes an end wall extending upwardly and two side walls extending upwardly which together define a second U-shaped frame structure having side edging supported by an inwardly extending flange of said second U-shaped frame structure and an interior sheet edge at the open frame end of said second frame structure;
 a first of the two side walls of said first frame structure being in a nested arrangement with a first of the two side walls of said second frame structure for reception with the nested arrangement, a second of the two side walls of said first frame structure being in a nested arrangement with a second of the two side walls of the said second frame structure for reception with the nested arrangement;
 a first set of foldable wall elements attached to the two side walls and end wall of the platform section for location in a first position substantially flat with the support region and in a second position substantially upright relative to the inner cargo support region;
 a second set of foldable wall elements attached to the two side walls and end wall of the platform section for location in a first position substantially flat with the support region and in a second position substantially upright relative to the inner cargo support region;
 a receiver bar having a first end for securing to a receiver hitch on a vehicle and an elongated main body extending to a second end along a direction of elongation to support the cargo carrier;
 bridge support attached to the bottom surface of the platform section to support the cargo carrier.

14. A cargo carrier as recited in claim 13, wherein the first nested arrangement is provided in the first side wall of said first platform section and the second nested arrangement is provided in the second side wall of said second platform section.

15. A cargo carrier as recited in claim 13, wherein the end wall and two side walls of each of said first and second platform sections extend vertically away from a respective one of said inner cargo support regions and each offset is provided to maintain an interior surface of the side walls of said first platform section in a common plane with an interior surface of a contacting side wall of said second platform section.

16. A cargo carrier as recited in claim 13, wherein each set of foldable wall elements included three separate sections, one section for anchorage adjacent to the end wall and the other two respectively for anchorage adjacent each of the respective side walls.

17. A cargo carrier as recited in claim 13 including clamps for securing the foldable side walls relatively together when the walls are in an upright position.

18. A cargo carrier as recited in claim 13 wherein the foldable walls are formed of a mesh material.

19. A cargo carrier as recited in claim 13 wherein there are clamps for securing the foldable walls adjacent the cargo area when the foldable walls are substantially adjacent to the inner cargo support regions of said platform sections.

20. A cargo carrier as recited in claim 13 including a plurality of fasteners which, upon assembly of the cargo carrier, fasten respective free ends of the first and second nested relationships.

* * * * *